June 22, 1937.  L. S. PADDOCK  2,084,864
MEAT CURING METHOD
Filed June 3, 1935
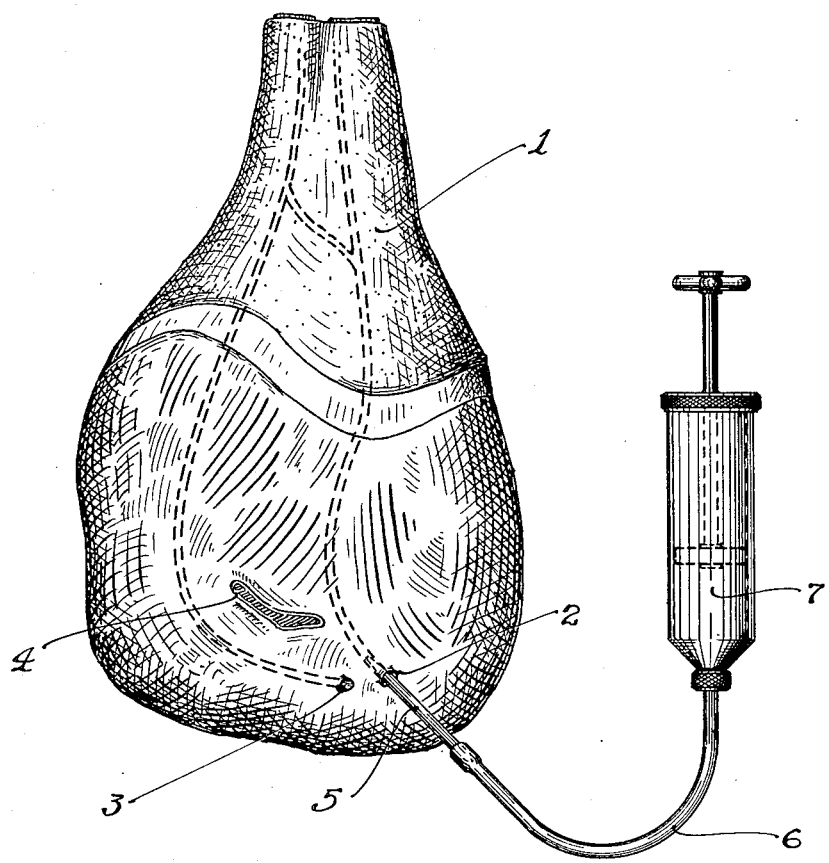
WITNESS—
Wm C. Meiser
L. Scott Paddock
INVENTOR
BY
ATTORNEY Patented June 22, 1937

2,084,864

UNITED STATES PATENT OFFICE 2,084,864

MEAT CURING METHOD

Levi Scott Paddock, Chicago, Ill., assignor to Industrial Patents Corporation, Chicago, Ill., a corporation of Delaware Application June 3, 1935, Serial No. 24,692

5 Claims. (Cl. 99—159)

This invention relates to meat curing methods and particularly to the curing of hams.

One of the objects of this invention is to provide a method whereby meat may be quickly cured.

Another object of the invention is to provide a method whereby meat may be more uniformly cured throughout its bulk.

Another object of the invention is to provide a curing method whereby hams may be cured without the conventional soaking operation.

Another object of the invention is to provide a method whereby hams may be cured in a controlled manner to bring about uniformity of cure as between the cushion side of the ham and the flank side of the ham.

Other objects of the invention will be apparent from the description and claims which follow.

In the accompanying drawing the inside surface of the ham 1 is shown with the ends of the two branches 2 and 3 of the iliac artery exposed. For convenience, the blood vessel 2 will be called the flank branch of the iliac artery and blood vessel 3 will be called the cushion branch of the iliac artery. The ends are shown protruding slightly above the surface of the ham behind the aitch bone 4. The general paths of the branches of the iliac artery are shown in dotted lines. A nipple 5 is inserted into the exposed portion of the artery into which it is desired to pump curing pickle. The nipple 5 is shown in the drawing as being fed through line 6 leading from pump 7. In practicing the present invention the branches 2 and 3 of the iliac artery are exposed at the time of butchering. The nipple 5 is inserted into one of the branches and the curing pickle pumped into the artery through line 6 leading from pump 7.

In the preferred method of practicing the invention the hogs are butchered in the usual manner, care being taken to avoid destruction of the iliac artery. In other respects, the hams are trimmed and chilled to the proper temperature as in ordinary practice.

Green hams, after butchering, are ordinarily chilled to a temperature of from 32° to 40° Fahrenheit, at which temperature a uniformly low temperature throughout is assured. This temperature results in the ham being somewhat too rigid for satisfactory pumping, and in the preferred practice of this invention the hams are raised to a temperature of 38° to 40° Fahrenheit, at which temperature the pumping operation may be successfully carried out without danger of spoilage which would result if the temperature were carried very much above this point.

In carrying out the present invention the branches 2 and 3 of the iliac artery are dissected out and the nipple 5, which may be similar to a hypodermic needle, is inserted into the artery and held in place by the operator while the curing pickle is pumped into the ham. It will be understood, of course, that any pickle formula may be used. I find in practice, however, that a very satisfactory formula consists of a fully saturated sodium chloride solution containing seven per cent or eight per cent sugar, 0.2% sodium nitrite and 0.2% sodium nitrate.

In accordance with the procedure of my Patent No. 1,951,436, entitled Meat curing method, which issued March 20, 1934, the ham may be pumped by dissecting out the iliac artery which leads to the two branches which have been mentioned. In the present invention, however, each branch is pumped separately, approximately 60% of the pickle being pumped into the blood vessel leading to the cushion side of the ham and approximately 40% of the pickle being pumped into the blood vessel leading to the flank side of the ham. I have discovered that since the muscles on the flank side of the ham do more work in life than the muscles on the cushion side of the ham, these muscles are more richly supplied with blood and consequently have a greater amount of blood vessels in proportion to the amount of flesh.

It will readily be seen, therefore, that if the curing pickle is pumped into the iliac artery an uneven cure will result due to the relatively greater supply of pickle pumped into the flank side of the ham.

In accordance with the present invention, after the pickle is pumped into the ham in the proportion of about 60% to the cushion side and about 40% to the flank side at a pressure of about 10 pounds, the total pickle supplied being about 10% of the original weight of the ham, the ham is immersed in a regular curing pickle for two or three days to equalize the cure and is then ready for smoke.

As is pointed out in my prior patent, No. 1,951,436, arterial pumping followed by an equalizing soak of two or three days results in a more uniform cure than is possible by the ordinary curing method of permitting the product to remain immersed for several weeks in the curing pickle, since the immersion method of curing tends to develop a high concentration of curing agents in the outer portions of the product. Attempts to lessen this concentration by subsequent soaking ordinarily removes only the curing material at the surface of the product to a depth of perhaps 1/16 to 1/4 of an inch. It has been found in practice that the present invention results in a very much more uniform cure than it is possible to secure by any other known method. The short immersion which is given the product in the practice of the present invention, in addition to equalizing the cure, is of value in permitting the development of the characteristic ham flavor and the elimination of the undesirable porky flavor of the green ham.

It will be seen, therefore, that the present invention is an improvement on the method described and claimed in my aforesaid patent, No. 1,951,436, and involves supplying a larger quantity of curing pickle to those muscles which are less richly supplied with blood vessels than is possible by my former procedure.

I claim:

1. The method of curing ham uniformly throughout its bulk which consists in first chilling and then pumping curing pickle into the circulatory system to distort the collapsed arteries, supplying a relatively greater proportion of the pickle to the cushion side of the ham than to the flank side of the ham to provide a uniform distribution of the pickle throughout the ham and thereafter immersing in a curing pickle a sufficient length of time to equalize the cure throughout the bulk of the ham and develop the flavor desired.

2. The method of curing hams which consists in first chilling the ham, then dissecting out the cushion branch of the iliac artery and the flank branch of the iliac artery, pumping into the ham through each such artery under a pressure of about ten pounds to distort the arteries a quantity of curing pickle of approximately ten per cent the weight of the ham, approximately 60% of the curing pickle being supplied to the cushion side of the ham and approximately 40% of the curing pickle being supplied to the flank side of the ham.

3. The method of curing hams which consists in first chilling the ham, then dissecting out the cushion branch of the iliac artery and the flank branch of the iliac artery, pumping into the ham through each such artery under a pressure of about ten pounds to distort the arteries a quantity of curing pickle of approximately ten per cent the weight of the ham, approximately 60% of the curing pickle being supplied to the cushion side of the ham and approximately 40% of the curing pickle being supplied to the flank side of the ham and thereafter immersing in a curing pickle a sufficient length of time to equalize the cure throughout the bulk of the ham and develop the flavor desired.

4. The method of curing hams which consists in first chilling the ham, then dissecting out the cushion branch of the iliac artery and the flank branch of the iliac artery, pumping into the ham through each such artery under pressure to distort the arteries a quantity of curing pickle of approximately ten per cent the weight of the ham, approximately 60% of the curing pickle being supplied to the cushion side of the ham and approximately 40% of the curing pickle being supplied to the flank side of the ham.

5. The method of curing hams which consists in first chilling the ham, then dissecting out the cushion branch of the iliac artery and the flank branch of the iliac artery, pumping into the ham through each such artery under pressure to distort the arteries a quantity of curing pickle of approximately ten per cent the weight of the ham, approximately 60% of the curing pickle being supplied to the cushion side of the ham and approximately 40% of the curing pickle being supplied to the flank side of the ham and thereafter immersing in a curing pickle a sufficient length of time to equalize the cure throughout the bulk of the ham and develop the flavor desired.

LEVI SCOTT PADDOCK.